(12) United States Patent
Kobayashi et al.

(10) Patent No.: US 10,608,229 B2
(45) Date of Patent: Mar. 31, 2020

(54) BATTERY MODULE, BATTERY, AND ELECTRIC DEVICE

(71) Applicant: Kabushiki Kaisha Toshiba, Minato-ku (JP)

(72) Inventors: Hiroyuki Kobayashi, Yokohama (JP); Tomomi Kageyama, Shibuya (JP); Takeshi Yasuda, Yokohama (JP); Kaoru Koiwa, Shibuya (JP); Seiji Ito, Yokohama (JP); Tomonori Ezoe, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 232 days.

(21) Appl. No.: 15/257,343

(22) Filed: Sep. 6, 2016

(65) Prior Publication Data

US 2017/0263910 A1    Sep. 14, 2017

(30) Foreign Application Priority Data

Mar. 9, 2016 (JP) .................................. 2016-045189

(51) Int. Cl.
*H01M 2/20* (2006.01)
*H01M 2/10* (2006.01)
(Continued)

(52) U.S. Cl.
CPC .......... *H01M 2/206* (2013.01); *H01M 2/1077* (2013.01); *H01M 10/0525* (2013.01); *H01M 10/0585* (2013.01); *H01M 10/425* (2013.01); *H01M 10/613* (2015.04); *H01M 10/625* (2015.04); *H01M 10/647* (2015.04); *H01M 10/6554* (2015.04); *H01M 2220/20* (2013.01); *Y02E 60/122* (2013.01)

(58) Field of Classification Search
CPC .......... H01M 2/20; H01M 2/206; H01M 2/10; H01M 2/1077
See application file for complete search history.

(56) References Cited

U.S. PATENT DOCUMENTS 7,553,566 B2    6/2009 Bette et al.
2004/0101737 A1    5/2004 Bette et al.
(Continued)

FOREIGN PATENT DOCUMENTS

GB     884262 A        12/1961
JP     H03-112868 U    11/1991
(Continued)

*Primary Examiner* — Karie O'Neill Apicella
(74) *Attorney, Agent, or Firm* — Oblon, McClelland, Maier & Neustadt, L.L.P.

(57) ABSTRACT

According to one embodiment, a battery module includes a plurality of sub-modules. The plurality of sub-modules are integrated. Each of the plurality of sub-modules includes a cell group configured using a plurality of cells connected in series. The plurality of cells configuring the cell group are arranged linearly such that intra-cell current directions are parallel and the intra-cell current direction of each of the cells is opposite to the intra-cell current direction of the cell adjacent to each cell in the cell group. Each of the plurality of sub-modules includes an input terminal to input a current to the cell group and an output terminal to output the current from the cell group.

14 Claims, 17 Drawing Sheets

(51) Int. Cl.
     *H01M 10/613*     (2014.01)
     *H01M 10/625*     (2014.01)
     *H01M 10/6554*    (2014.01)
     *H01M 10/42*      (2006.01)
     *H01M 10/647*     (2014.01)
     *H01M 10/0585*    (2010.01)
     *H01M 10/0525*    (2010.01)

(56) References Cited

U.S. PATENT DOCUMENTS

| | | | |
|---|---|---|---|
| 2011/0027634 A1* | 2/2011 | Kishimoto | H01M 2/206 429/90 |
| 2011/0111267 A1 | 5/2011 | Van Schyndel | |
| 2011/0262798 A1 | 10/2011 | Neumann et al. | |
| 2014/0370348 A1 | 12/2014 | Schmidt et al. | |
| 2015/0287970 A1 | 10/2015 | Shinohara | |

FOREIGN PATENT DOCUMENTS

| | | | | |
|---|---|---|---|---|
| JP | H03112868 U | * | 11/1991 | H01M 2/20 |
| JP | 2003-242956 A | | 8/2003 | |
| JP | 2004-510318 | | 4/2004 | |
| JP | 2011-049155 A | | 3/2011 | |
| JP | 2013-109914 A | | 6/2013 | |
| JP | 2013109914 A | * | 6/2013 | H01M 2/20 |

\* cited by examiner

BATTERY MODULE, BATTERY, AND ELECTRIC DEVICE

CROSS-REFERENCE TO RELATED APPLICATION

This application is based upon and claims the benefit of priority from the prior Japanese Patent Application No. 2016-045189, filed on Mar. 9, 2016, the entire contents of which are incorporated herein by reference.

FIELD

Embodiments described herein relate generally to a battery module, a battery, and an electric device.

BACKGROUND

A plurality of cells may be connected to configure one battery. The cell becomes a minimum unit when the battery is configured.

The battery that is configured using the plurality of cells can output large power. However, because a large current flows through the battery capable of outputting the large power, the battery generates a large magnetic field (stray magnetic field) outside the battery. A battery that generates a small magnetic field can be obtained by designing the battery in consideration of generation of the magnetic field. However, the design requires a large amount of labor.

DETAILED DESCRIPTION

Figure 1:
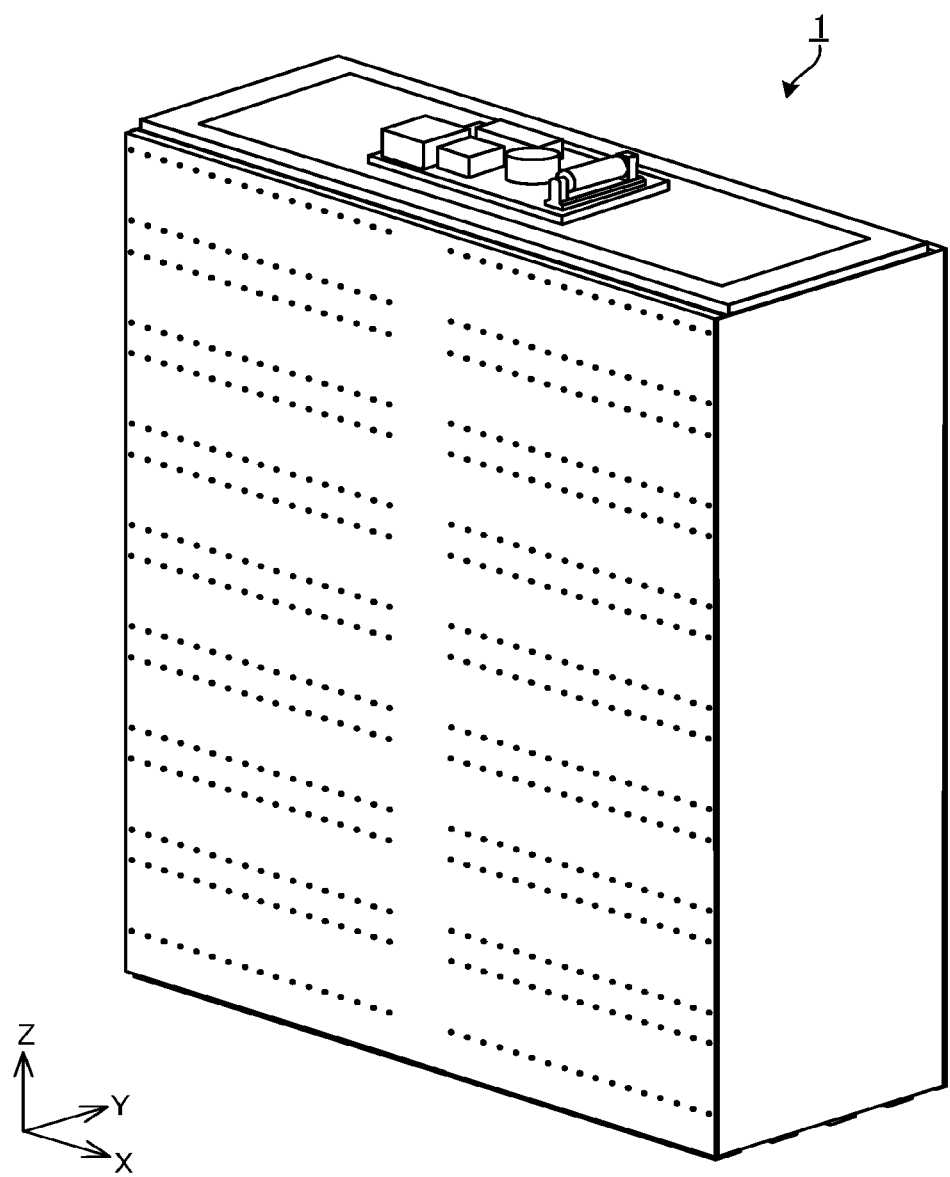
FIG. 1 is a diagram illustrating a battery according to a first embodiment.

A battery module according to an embodiment includes a plurality of sub-modules. The plurality of sub-modules are integrated. Each of the plurality of sub-modules includes a cell group that is configured using a plurality of cells connected in series. The plurality of cells configuring the cell group are arranged linearly such that intra-cell current directions are parallel and the intra-cell current direction of each of the cells is opposite to the intra-cell current direction of the cell adjacent to each cell in the cell group. Each of the plurality of sub-modules includes an input terminal to input a current to the cell group and an output terminal to output the current from the cell group.

Hereinafter, embodiments will be described with reference to the drawings. In the drawings, same or equivalent portions are denoted with the same reference numerals.

First Embodiment

FIG. 1 is a diagram illustrating a battery 1 including a battery module according to a first embodiment. The battery 1 is a storage battery that is disposed in a moving object (for example, a plane, a vehicle, or a ship) and is used. The battery 1 supplies power to the moving object and stores power by a generator of the moving object.

In the following description, an orthogonal coordinate system including an X axis, a Y axis, and a Z axis is used. In the drawings, a direction indicated by an arrow is a plus direction. In addition, an X-axis plus direction is a rightward direction and an X-axis minus direction is a leftward direction. In addition, a Y-axis plus direction is a backward direction (back surface direction) and a Y-axis minus direction is a forward direction. In addition, a Z-axis plus direction is an upward and a Z-axis minus direction is a downward direction.

Figure 2:
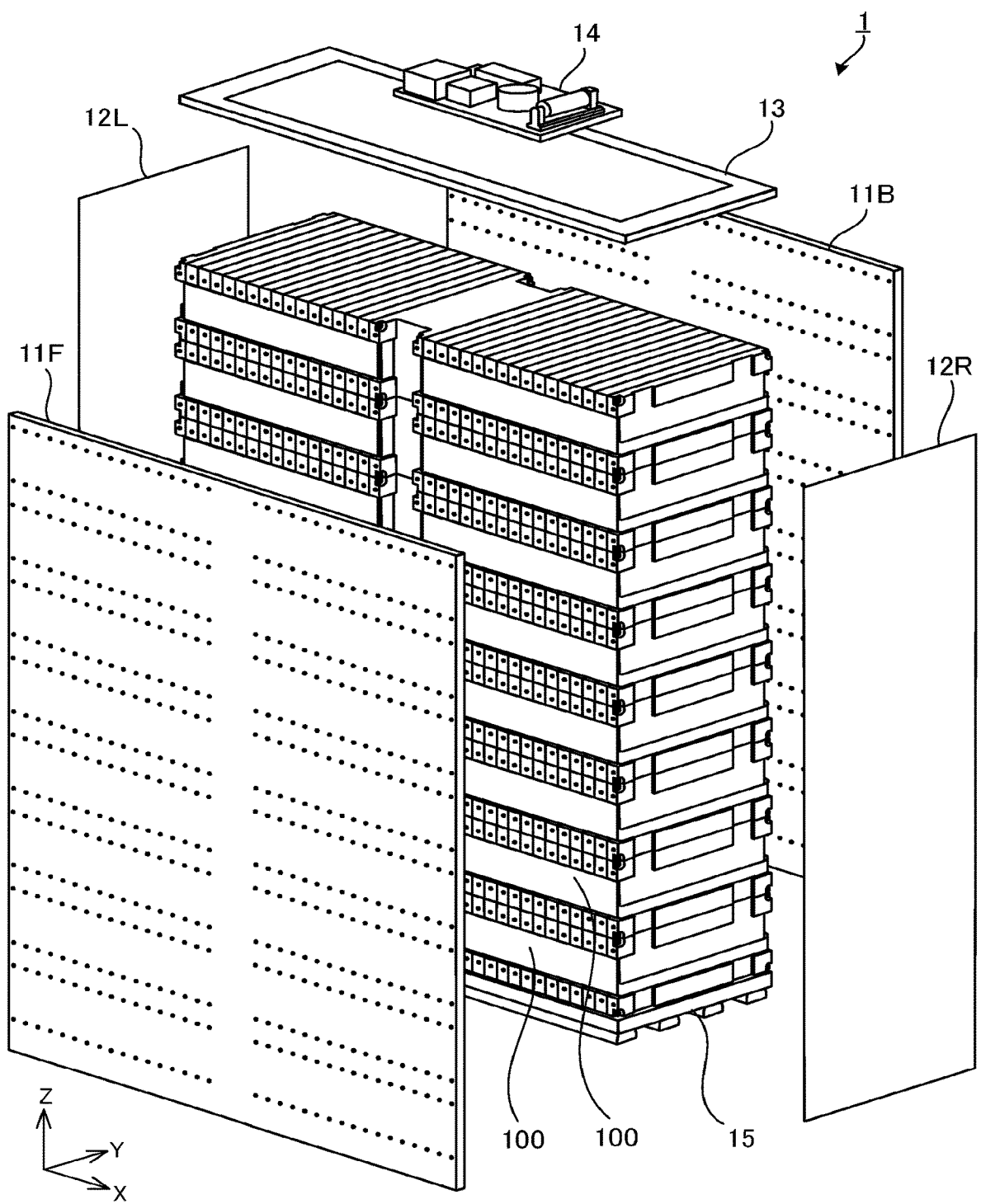
FIG. 2 is an exploded view of the battery illustrated in FIG. 1.

FIG. 2 is an exploded view of the battery 1. The battery 1 includes a pair of front and rear cooling plates 11F and 11B, a pair of left and right lateral plates 12L and 12R, a top plate 13, a battery management unit (BMU) 14, a base 15, and a plurality of laminated battery modules 100.

The cooling plates 11F and 11B are plates that become heat paths of heat emitted from the battery modules 100. The cooling plates 11F and 11B are fixed on front and rear surfaces of the battery modules 100. The cooling plate is configured using a metal having high heat conductivity, such as iron and aluminum. The cooling plates 11F and 11B may be configured using a magnetic material such as iron, such that a magnetic field can be confined in the battery. Or, the cooling plates 11F and 11B may be configured using a non-magnetic material such as stainless, such that surfaces thereof are not magnetized.

The lateral plates 12L and 12R are plates that are disposed on lateral surfaces of the battery 1. The lateral plates 12L and 12R are fixed on left and right surfaces of the battery modules 100. The lateral plates 12L and 12R may be configured using a magnetic material and may be configured using a non-magnetic material. In addition, the lateral plates 12L and 12R may be configured using a metal having high heat conductivity. When the lateral plates 12L and 12R are configured using the metal having the high heat conductivity, the lateral plates 12L and 12R function as heat paths, similar to the cooling plates 11F and 11B.

The top plate 13 is a plate that is disposed on a top surface of the battery 1. The top plate 13 is disposed on a top surface of the battery module 100 of an uppermost step. The battery management unit 14 is disposed on the top plate 13.

The battery management unit 14 is a unit to control charge/discharge of the battery 1. The battery management unit 14 includes sensors (for example, current, voltage, and temperature sensors) to monitor a state of the battery 1 and a processor to control the battery 1, for example. The battery management unit 14 detects overcharge, overdischarge, and overcurrent of the battery 1 on the basis of signals from the sensors and executes control such as stop of the charge/discharge and a state report to an upper battery management system.

The base 15 is a base to place the battery module 100. The base 15 includes a base plate that has a size almost equal to a size of a bottom surface of the battery module 100. A vibration absorbing rubber to reduce a vibration of the moving object is disposed below the base plate. The plurality of battery modules 100 are laminated on the base plate.

Figure 3:
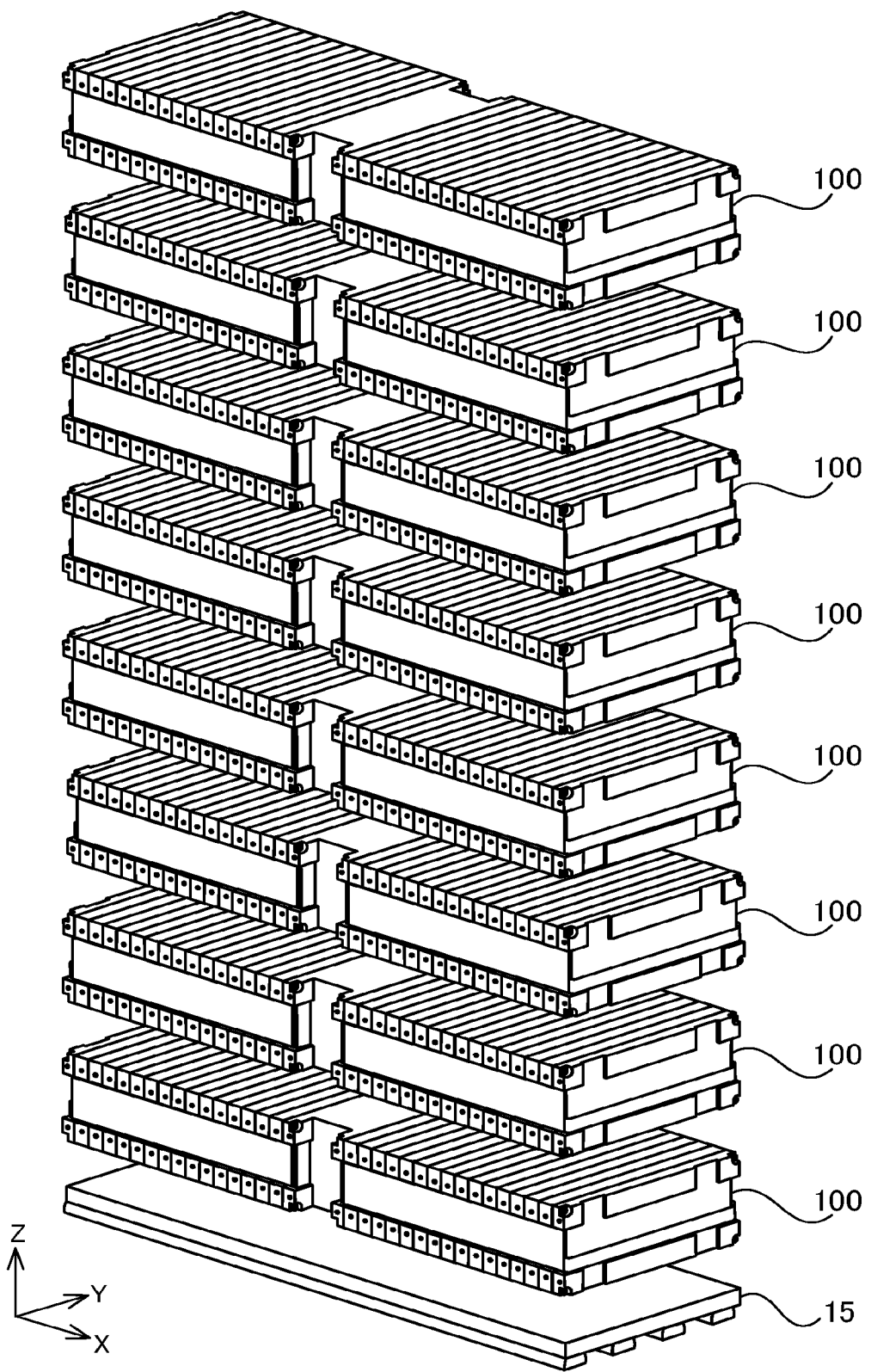
FIG. 3 is an exploded view of a center portion of the battery illustrated in FIG. 1.

FIG. 3 is an exploded view of a center portion (portion of the base 15 and the battery modules 100) of the battery 1. The eight battery modules 100 are laminated on the base 15. The number of laminated battery modules 100 is not limited to 8. The number of laminated battery modules 100 may be larger than 8 and may be smaller than 8. However, the number of laminated battery modules 100 is preferably an even number. More preferably, the number of laminated battery modules 100 is a multiple of 4.

Figure 4:
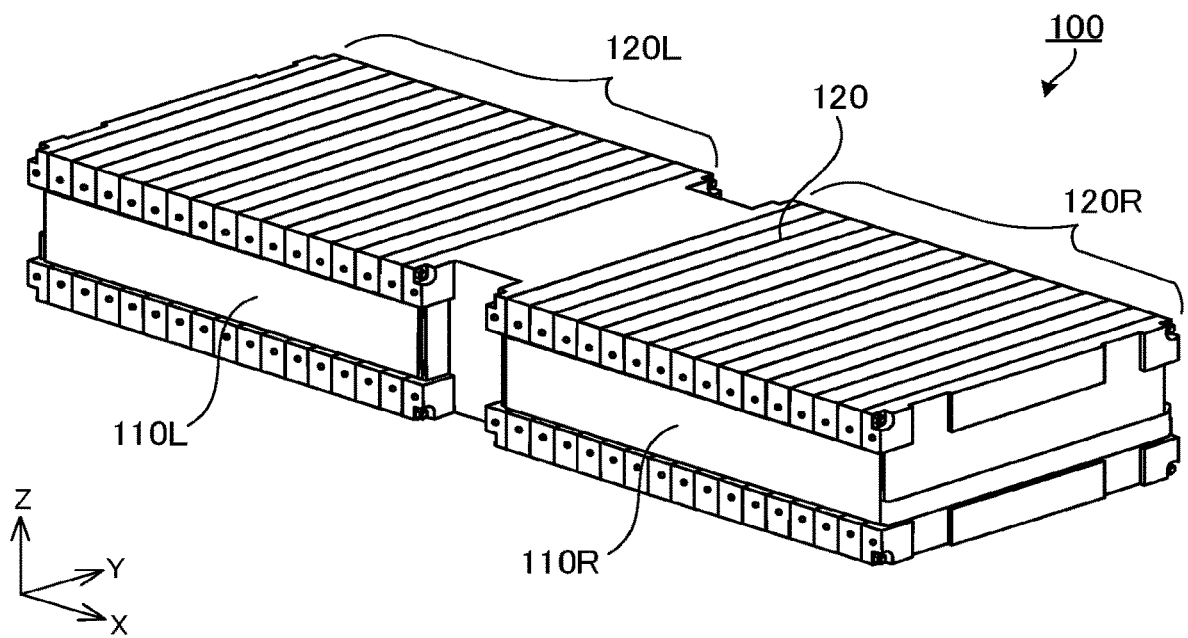
FIG. 4 is a perspective view of a battery module.

FIG. 4 is a perspective view of the battery module 100. The battery module 100 is one functional collection to construct the battery. The battery module 100 according to the first embodiment is a battery module of 2 sub-modules including two sub-modules (120L and 120R illustrated in FIG. 4). The sub-module is a functional collection configuring the battery module. The sub-module 120L and the sub-module 120R are arranged in a horizontal direction.

The battery module 100 includes two cell monitoring units (CMU) 110L and 110R and a module body 120 including the two sub-modules 120L and 120R.

Figure 5:
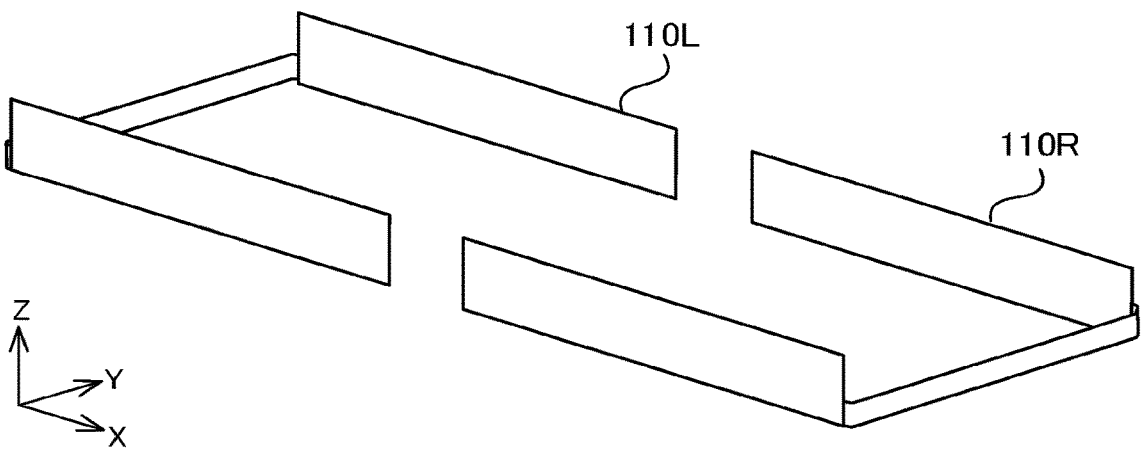
FIG. 5 is a perspective view of a cell monitoring unit.

FIG. 5 is a perspective view of the cell monitoring units 110L and 110R. The cell monitoring units 110L and 110B are units to measure a voltage and a temperature for each of the cells configuring the battery module 100. The cell monitoring unit 110L is disposed on the sub-module 120L and the cell monitoring unit 110R is disposed on the sub-module 120R. Each of the cell monitoring units 110L and 110R includes two substrates. One substrate is disposed on a front surface of the sub-module 120L or 120R and the other substrate is disposed on a back surface of the sub-module 120L or 120R. The two substrates are connected to terminals 22 of the cells exposed to the front surfaces and the back surfaces of the sub-modules 120L and 120R.

Circuits (a voltage sensor, a thermistor, and the like) to measure a current, a voltage, and a temperature are formed in each of the two substrates configuring the cell monitoring units 110L and 110R. Each of the two substrates measures a current, a voltage, and a temperature of each cell. The cell monitoring units 110L and 110R are connected to the battery management unit 14 by a wiring line (not illustrated in the drawings) disposed in a wiring space. The battery management unit 14 controls the battery 1, on the basis of information from the cell monitoring units 110L and 110R.

In this embodiment, the 16 cells 20 are laminated to configure one battery module 100. The number of laminated cells 20 in one sub-module is not limited to 16. The number of laminated cells 20 may be larger than 16 and may be smaller than 16. When demagnetization is considered, the number of laminated cells 20 is preferably an even number.

Figure 7:
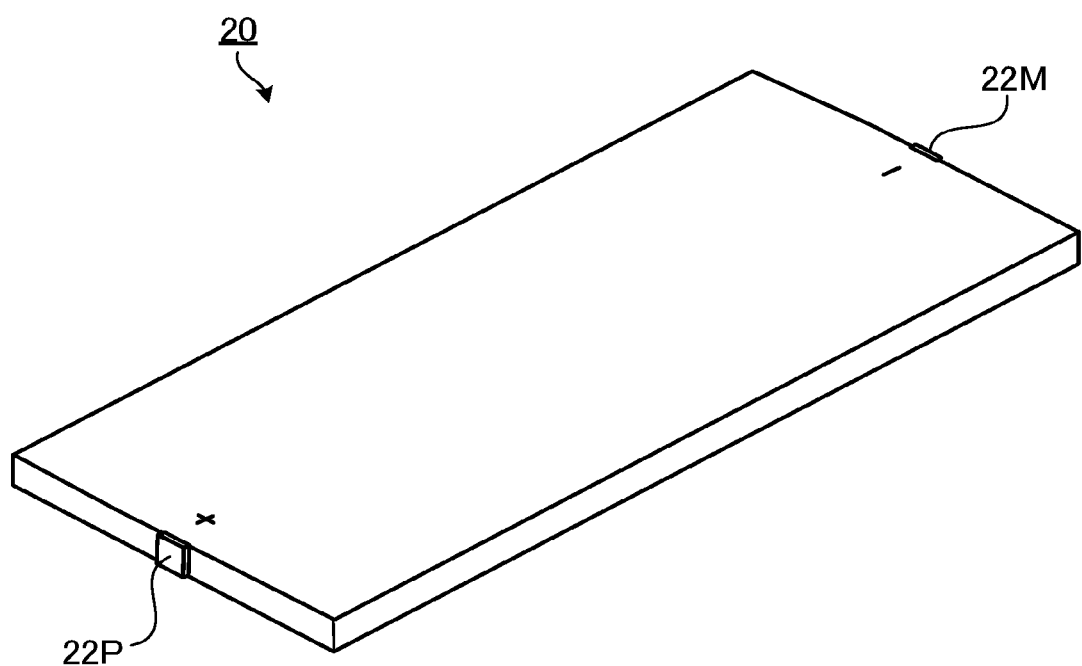
FIG. 7 is a perspective view of the cell.

FIG. 7 is a perspective view of the cell 20. The cell becomes a minimum unit (battery unit) when the battery is configured. The cell 20 is a lithium-ion-type cell that can store power, for example. The cell 20 is a rectangular plate and input and output terminals (22P and 22M illustrated in FIG. 7) of a current are disposed on both ends of a longitudinal direction of the cell 20. 22P shows a plus terminal and 22M shows a minus terminal.

Figure 6A:
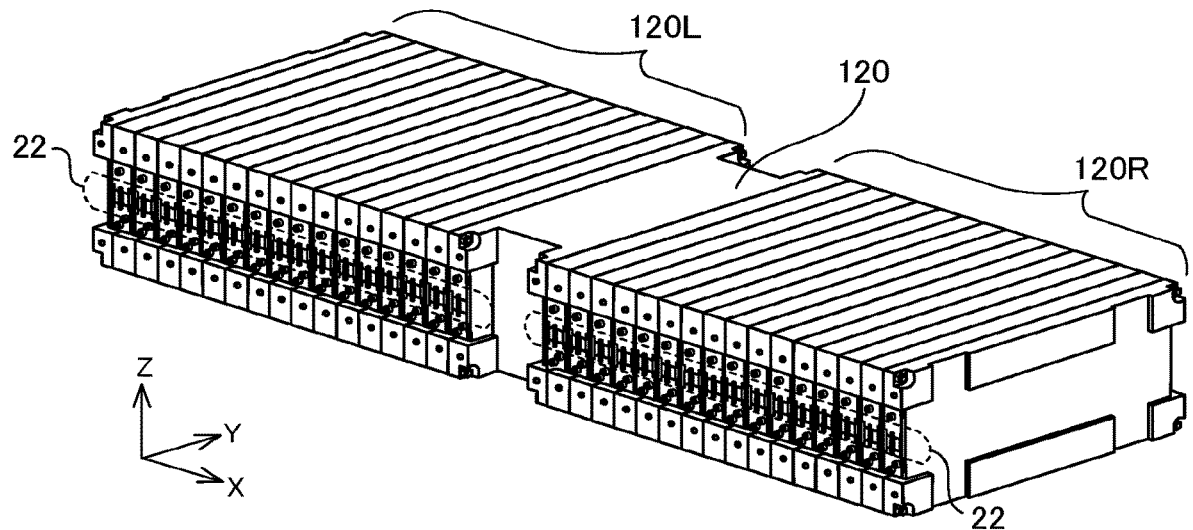
FIG. 6A is a diagram illustrating a module body of the battery module.
Figure 6B:
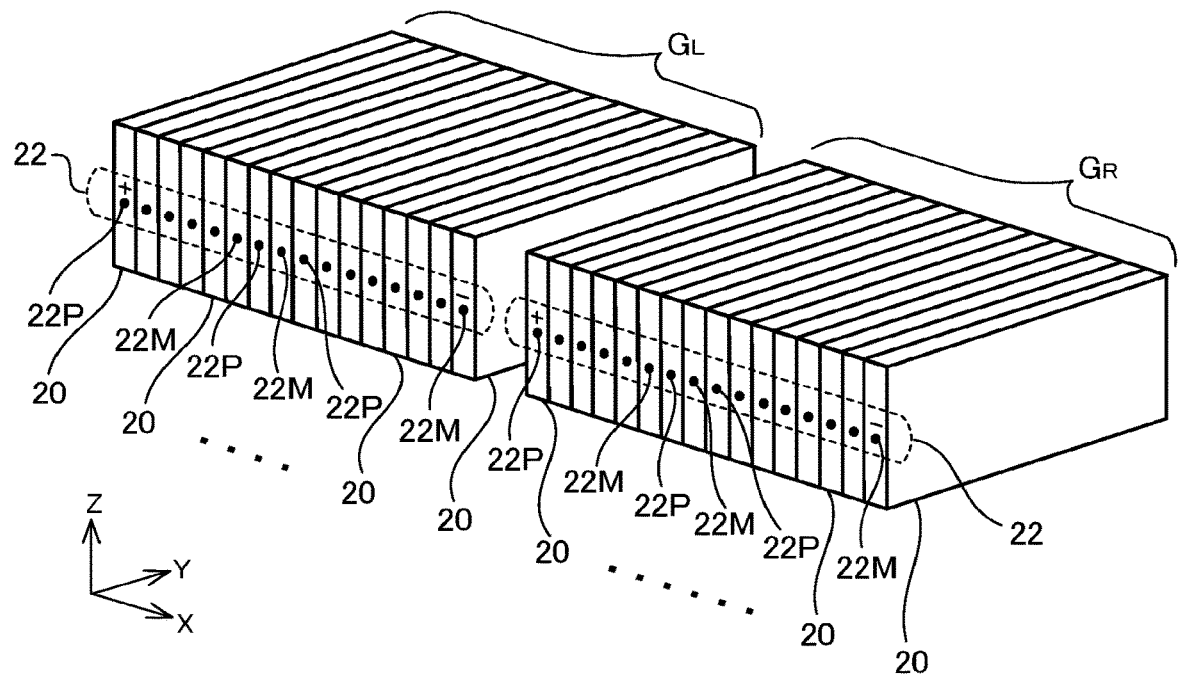
FIG. 6B is an extraction diagram of only cells from the module body.

FIG. 6B illustrates a state in which only the cells 20 are extracted from the battery module 100 to easily view an arrangement of the cells 20 in the battery module 100. As seen from FIG. 6B, the cells 20 are arranged such that intra-cell current directions are parallel. The intra-cell current direction is a direction of a current flowing through the cell 20 when the battery 1 supplies power to a load, for example, a direction toward the plus terminal 22P from the minus terminal 22M.

As described above, the two sub-modules 120L and 120R are included in the battery module 100 and the two sub-modules 120L and 120R are arranged in a horizontal direction (lamination direction of the cells 20). For this reason, a cell group $G_L$ configured using 16 cells and a cell group $G_R$ configured using 16 cells 20, similar to the cell group $G_L$, are formed in the battery module 100. The cell group $G_L$ corresponds to the sub-module 120L illustrated in FIG. 6A and the cell group $G_R$ corresponds to the sub-module 120R illustrated in FIG. 6A.

Polarities of the 16 cells 20 in each sub-module (each cell group) are alternately inverted. The 16 cells 20 in the cell group are connected in series to configure one sub-module. Terminals of the cells positioned at ends in the cell group become the input and output terminals of the current. That is, the plus terminal 22P of the cell 20 of a left end (end of an X-axis minus direction) in the cell group $G_L$ becomes an output terminal (plus terminal) of the sub-module 120L and the minus terminal 22M of the cell 20 of a right end (end of an X-axis plus direction) in the cell group $G_L$ becomes an input terminal (minus terminal) of the sub-module 120L. In addition, the plus terminal 22P of the cell 20 of a left end (end of the X-axis minus direction) in the cell group $G_R$ becomes an output terminal (plus terminal) of the sub-module 120R and the minus terminal 22M of the cell 20 of a right end (end of the X-axis plus direction) in the cell group $G_R$ becomes an input terminal (minus terminal) of the sub-module 120R. Because one battery module 100 is configured using the two sub-modules of the sub-modules 120L and 120R, one battery module 100 has a total of four input and output terminals including two input terminals and two output terminals.

In an example of FIG. 6B, the polarities of the two sub-modules 120R and 120L are the same. However, the polarities may be different. For example, the left and right sides of the sub-module 120L may be used as the output terminal (plus terminal) and the input terminal (minus terminal), respectively, and the left and right sides of the sub-modules 120R may be used as the input terminal (minus terminal) and the output terminal (plus terminal), respectively.

Figure 8:
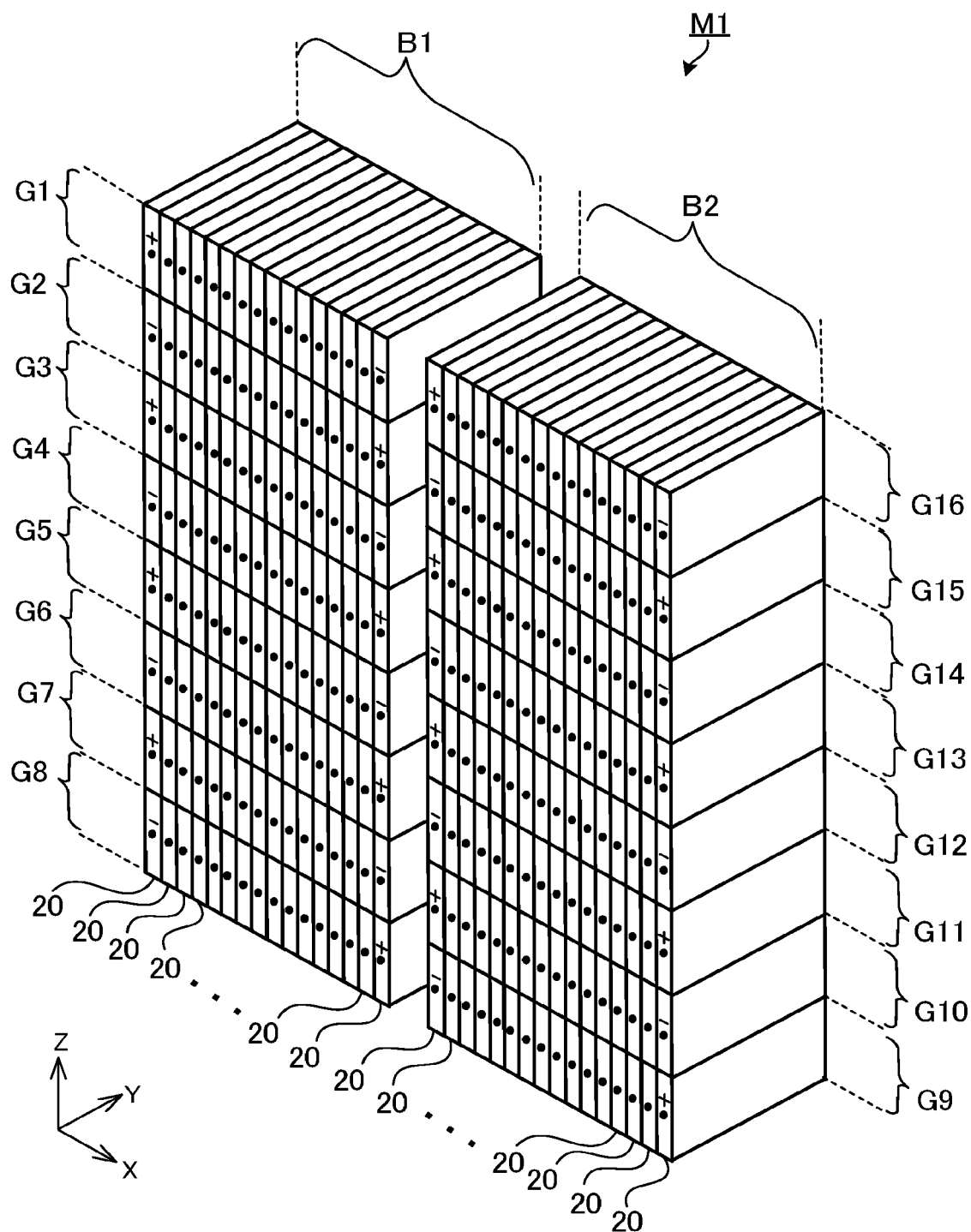
FIG. 8 is an extraction diagram of only the cells from the battery.

The battery 1 has a structure in which the battery modules 100 are laminated in a Z-axis direction in 8 steps. The battery modules 100 are laminated such that polarities thereof are alternately inverted. FIG. 8 illustrates a state in which only the cells 20 are extracted from the battery 1 to easily view an arrangement of the cells 20 in the battery 1. As seen from FIG. 8, the cells 20 are arranged such that intra-cell current directions are parallel. The plurality of cells 20 configuring the battery 1 form a matrix M1 with directions vertical to the intra-cell current direction (Y-axis direction) as a row direction and a column direction. In the case of this embodiment, the row direction is the X-axis direction and the column direction is the Z-axis direction.

The matrix M1 is configured using 16 cell groups G1 to G16. A set of left and right cell groups is one battery module 100. That is, the cell groups G1 and G16 are one battery module 100, the cell groups G2 and G15 are one battery module, . . . , and the cell groups G8 and G9 are one battery module 100. The battery 1 is obtained by laminating the battery modules 100 in the column direction. Because the matrix M1 is obtained by laminating the battery modules 100, cell group columns of two columns of a cell group column B1 (first cell group column) and a cell group column B2 (second cell group column) are formed in the matrix M1. The cell group column is obtained by laminating the cell groups in the column direction. More specifically, the cell group column B1 is configured using 8 cell groups including the cell groups G1 to G8 and the cell group column B2 is configured using 8 cell groups including the cell groups G9 to G16. These 16 cell groups G1 to G16 are connected in series.

One cell group is configured using the 16 cell groups 20. The 16 cells 20 are alternately arranged such that a plus pole and a minus pole are alternately inverted. In addition, the plurality of cells 20 in the cell group are connected in series by the two substrates of the cell monitoring units 110L and 110R. In addition, the cell groups G1 to G16 are connected in series by a wiring line not illustrated in the drawings. As a result, all 256 (16 rows×16 columns) cells 20 belonging to the matrix M1 are connected in series.

As described above, the cells 20 in one cell group are alternately arranged such that the plus pole and the minus pole are alternately inverted. In addition, the cell groups G1 to G16 are alternately arranged such that the plus pole and the minus pole are alternately inverted sequentially from the upper side, when the terminals 22P and 22M of the cells 20 of the left and right ends are regarded as the plus pole and the minus pole of each of the cell groups. For this reason, all of the cells 20 configuring the matrix M1 are alternately arranged such that the plus pole and the minus pole are alternately inverted in the row direction and the column direction. That is, the intra-cell current direction of each of the cells 20 is opposite to the intra-cell current direction of the cell 20 adjacent to each cell in the row direction and the column direction.

Both of the cell groups G1 to G8 belonging to the cell group column B1 and the cell groups G9 to G16 belonging to the cell group column B2 are alternately arranged such that the plus pole and the minus pole are alternately inverted sequentially from the upper side. The cell group columns B1 and B2 are arranged in the row direction to form one matrix. For the polarities of the cell groups belonging to the cell group columns B1 and B2, the polarities become the same in the left and right cell groups adjacent to each other. For example, in both of the cell group G1 and the cell group G16 adjacent to the cell group G1 at the right side, the left side is the plus pole and the right side is the minus pole. In both of the cell group G2 and the cell group G15 below the cell group G1 and the cell group G16, the left side is the plus pole and the right side is the minus pole.

Figure 9A:
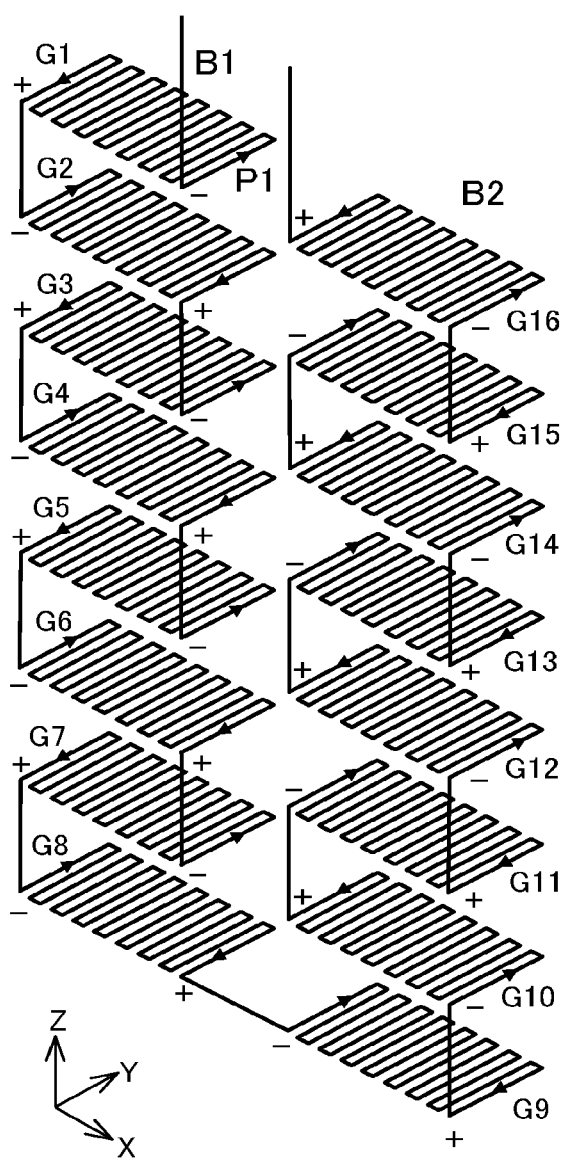
FIG. 9A is a diagram illustrating a current path formed by an intra-cell current.

FIG. 9A illustrates a current path formed in the battery 1, when the battery 1 is connected to a load. The cells 20 in one cell group are alternately arranged such that the plus pole and the minus pole are alternately inverted. For this reason, a rectangular pulse-like current path P1 is formed in each of the cell groups G1 to G16. That is, the intra-cell current direction of each of the cells 20 is opposite to the intra-cell current direction of the cell 20 adjacent to each cell in the row direction and the column direction.

Figure 10:
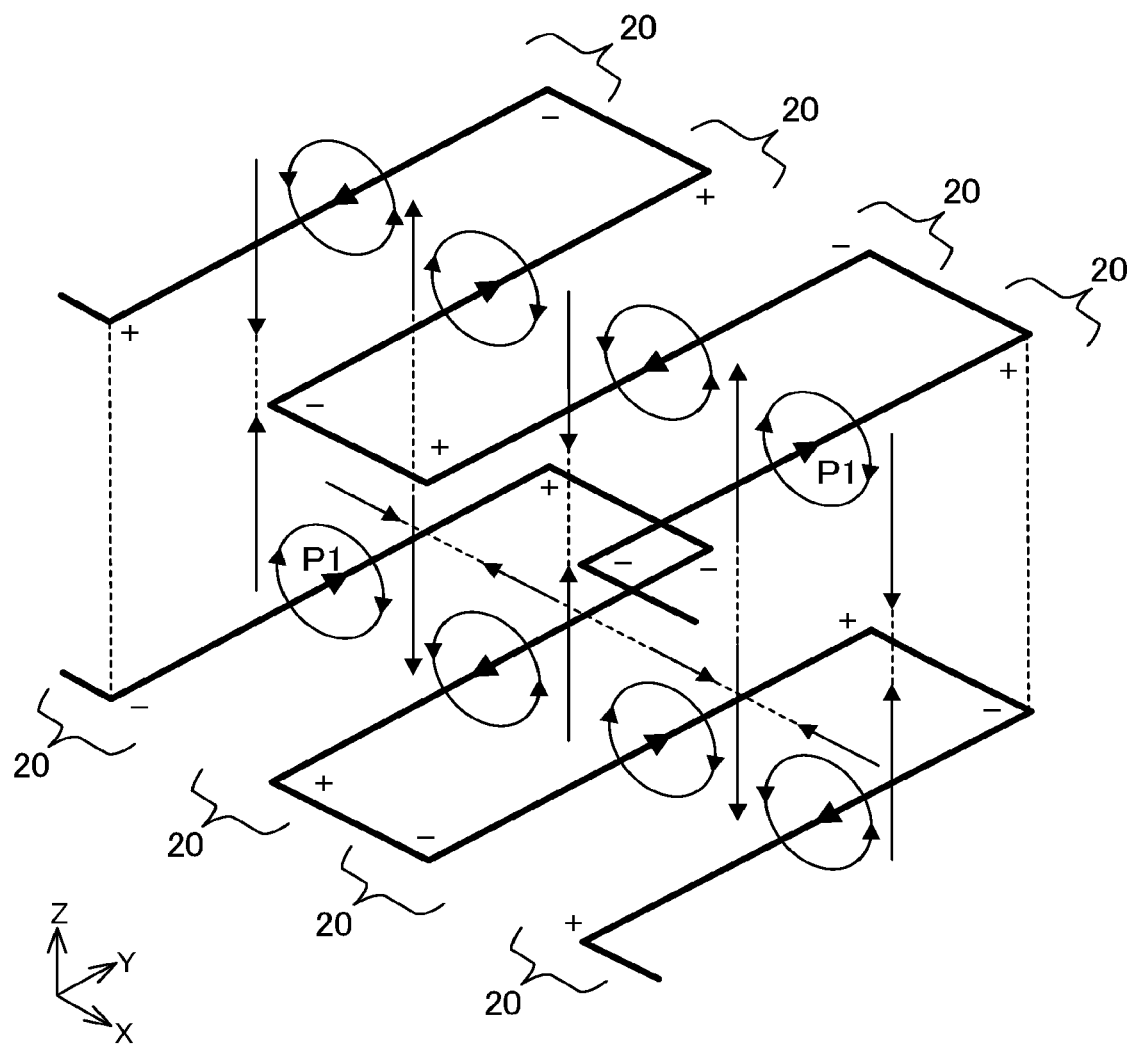
FIG. 10 is a partially enlarged view of the current path formed by the intra-cell current.

FIG. 10 is a partially enlarged view of the current path P1. By the intra-cell current, a magnetic field is generated in a shape of a concentric circle along the current path P1. The intra-cell current direction of each of the cells 20 is opposite to the intra-cell current direction of the cell 20 adjacent to each cell 20 in the row direction (X-axis direction). For this reason, directions of the magnetic fields of the row direction generated by the intra-cell current are alternately inverted and the magnetic fields are cancelled. The intra-cell current direction of each of the cells 20 is opposite to the intra-cell current direction of the cell adjacent to each cell 20 in the column direction (Z-axis direction). For this reason, directions of the magnetic fields of the column direction generated by the intra-cell current are alternately inverted and the magnetic fields are cancelled.

Figure 9B:
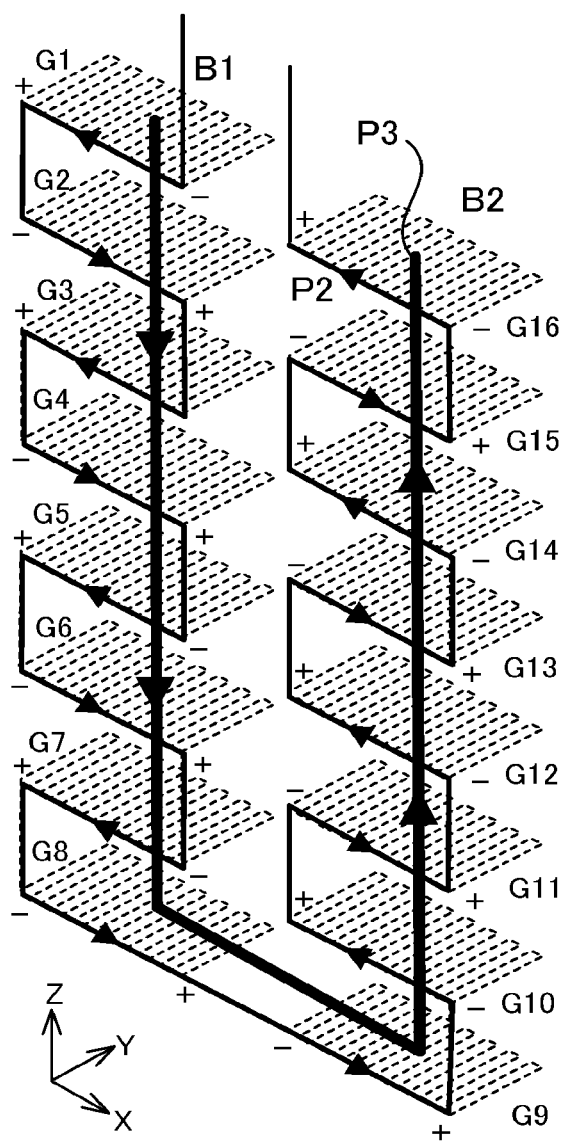
FIG. 9B is a diagram illustrating a current path formed by an intra-cell group current.

In addition, FIG. 9B illustrates a current path P2 formed by an intra-cell group current. The intra-cell group current flows in a direction of a current flowing through the cell group, that is, a direction toward the plus terminal of the cell group from the minus terminal of the cell group, when the cell group is regarded as one cell. The minus terminal of the cell group is a current input terminal (the minus terminal 22M of the cell 20 at one terminal of the cell group) of the cell group and the plus terminal of the cell group is a current output terminal (the plus terminal 22P of the cell 20 at the other end of the cell group) of the cell group.

The cell groups G1 to G8 in the cell group column B1 are alternately arranged such that the plus pole and the minus pole are alternately inverted. For this reason, the current path P2 formed in the cell group column B1 also becomes a rectangular pulse-like current path, similar to the current path P1. Likewise, the cell groups G9 to G16 in the cell group column B2 are alternately arranged such that the plus pole and the minus pole are alternately inverted. For this reason, the current path P2 of the intra-cell group current formed in the cell group column B2 also becomes a rectangular pulse-like current path. Because the intra-cell group current direction is opposite to the intra-cell group current direction of the neighboring cell group in the column direction (Z-axis direction), the directions of the magnetic fields of the column direction generated by the intra-cell group current are alternately inverted and the magnetic fields are cancelled, similar to the case of the intra-cell current illustrated in FIG. 10.

In addition, in the cell group column B1, a current flows in a downward direction (Z-axis minus direction) of the column direction and in the cell group column B2, a current flows in an upward direction (Z-axis plus direction) of the column direction. For this reason, the intra-cell group column current direction (direction of a current flowing through a current path P3 illustrated in FIG. 9B) is inverted in the cell group columns B1 and B2, when the cell group column is regarded as one cell. Therefore, the directions of the magnetic fields of the row direction generated by the intra-cell group column current are inverted and the magnetic fields are cancelled.

According to this embodiment, the plurality of cells 20 configuring the battery 1 are arranged in a matrix. The intra-cell current direction of each of the cells 20 is opposite to the intra-cell current direction of the cell 20 adjacent to each cell in the row direction and the column direction. For this reason, because the magnetic fields generated by the intra-cell current are cancelled, the magnetic field externally generated by the battery 1 decreases.

In addition, the intra-cell group current direction of each of the cell groups is opposite to the intra-cell group current direction of the cell group adjacent to each cell group in the column direction. For this reason, because the magnetic fields generated by the intra-cell group current are cancelled, the magnetic field externally generated by the battery 1 further decreases.

In addition, the battery 1 is configured using the two cell group columns of which the intra-cell group column current directions are opposite to each other. Because the magnetic fields of the row direction by the intra-cell group column current are cancelled, the magnetic field externally generated by the battery 1 further decreases.

In addition, the battery module 100 configuring the battery 1 is configured using the two sub-modules 120L and 120R. Each of the two sub-modules corresponds to one cell group. Each of the two sub-modules includes an input terminal to input a current to the cell group and an output terminal to output the current from the cell group. Therefore, a user can construct the battery 1 easily only by laminating the battery modules 100 and connecting the input and output terminals by the wiring line.

In addition, the battery module 100 is configured using the two sub-modules 120L and 120R. As compared with the case in which the two battery modules are arranged simply, a capacity (volume) of the two sub-modules (that is, the battery module 100) in the battery decreases. Because the capacity of the battery module 100 configuring the battery 1 decreases, an energy density of the battery 1 can be improved.

Second Embodiment

In the first embodiment, the direction (direction shown by P3 of FIG. 9B) of the current flowing through the cell groups is the same in the cell group column. However, the direction of the current between the cell groups may be different in each cell group column. Hereinafter, a battery 1 according to a second embodiment will be described.

Figure 11:
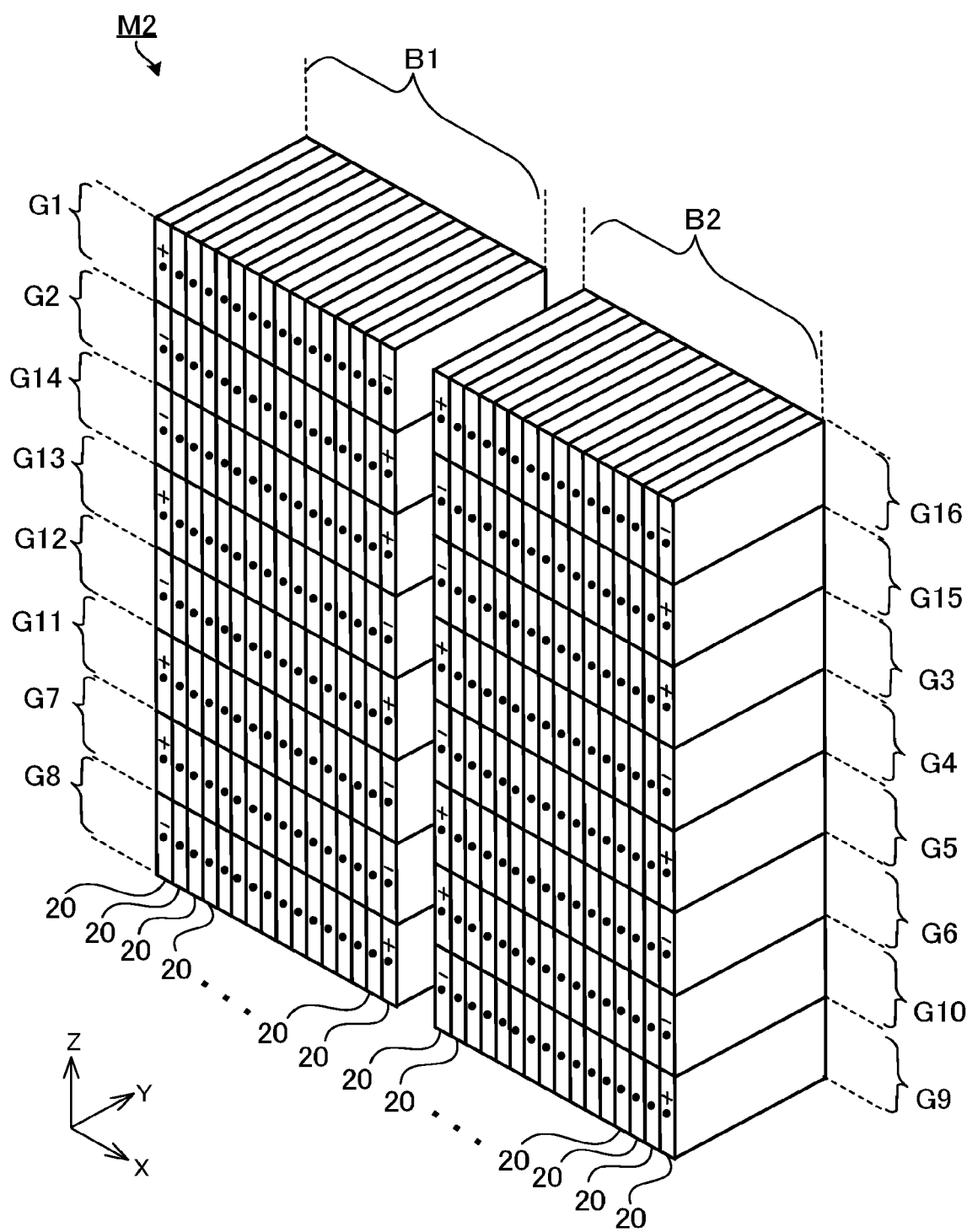
FIG. 11 is a diagram illustrating a matrix configuring a battery 1 according to a second embodiment.

FIG. 11 is a diagram illustrating a matrix M2 configuring the battery 1 according to the second embodiment. The matrix M2 is configured using 16 cell groups G1 to G16. Each of the cell groups G1 to G16 is the sub-module 120L or 120R described in the first embodiment. The matrix M2 is configured by laminating the battery modules 100 illustrated in the first embodiment in 8 steps. Similar to the matrix M1 according to the first embodiment, the matrix M2 is configured using cell group columns of two columns of a cell group column B1 (first cell group column) and a cell group column B2 (second cell group column).

Each of the cell group columns B1 and B2 is configured using 8 cell groups. The cell groups arranged in the cell group column B1 become G1, G2, G14, G13, G12, G11, G7, and G8 sequentially from the upper side. In addition, the cell groups arranged in the cell group column B2 become G16, G15, G3, G4, G5, G6, G10, and G9 sequentially from the upper side. The 16 cell groups G1 to G16 are connected in series. Connection order becomes ascending order of reference numerals, that is, order of G1, G2, . . . , and G16.

One cell group is configured using 16 cells 20. The cells 20 are alternately disposed such that a plus pole and a minus pole are alternately inverted. Similar to the first embodiment, the 16 cells 20 belonging to one cell group are connected in series. Because the cell groups G1 to G16 are also connected in series, all 256 (16 rows×16 columns) cells 20 belonging to the matrix M2 are connected in series.

Figure 12:
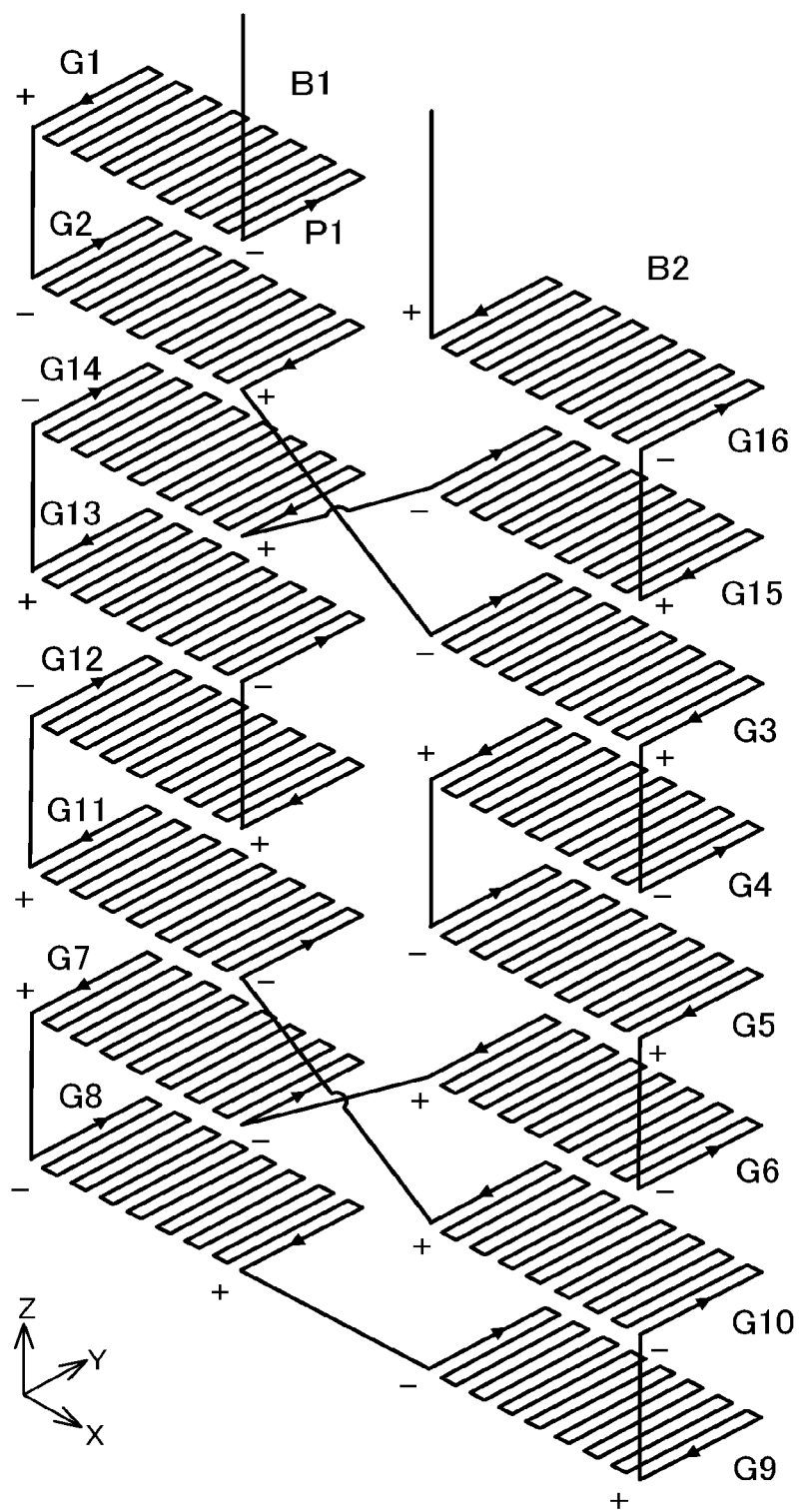
FIG. 12 is a diagram illustrating a current path formed by an intra-cell current.

FIG. 12 illustrates a current path P1 formed in the battery 1, when the battery 1 is connected to a load. For polarities of the 16 cell groups belonging to the cell group columns B1 and B2, the polarity of each cell group is opposite to the polarity of at least one neighboring cell group in a column direction. For example, in the cell group G1, a left side becomes a plus pole and a right side becomes a minus pole. However, in the cell group G2 adjacent to the cell group G1 below the cell group G1, a left side becomes a minus pole and a right side becomes a plus pole. In addition, for the polarities of the 16 cell groups belonging to the cell group columns B1 and B2, the polarities are the same in the left and right cell groups adjacent to each other. For example, in both of the cell group G1 and the cell group G16 adjacent to the cell group G1 at the right side, a left side becomes a plus pole and a right side becomes a minus pole.

The cells 20 in one cell group are alternately disposed. For this reason, a rectangular pulse-like current path P1 is formed in each of the cell groups G1 to G16. An intra-cell current direction is opposite to an intra-cell current direction in the neighboring cell in a row direction (X-axis direction). For this reason, directions of magnetic fields of the row direction generated by an intra-cell current are alternately inverted and the magnetic fields are cancelled. In addition, the intra-cell current direction is opposite to an intra-cell current direction of at least one cell 20 of the neighboring cells 20 in a column direction (Z-axis direction). For this reason, directions of magnetic fields of the column direction generated by the intra-cell current are inverted and the magnetic fields are cancelled.

Figure 13:
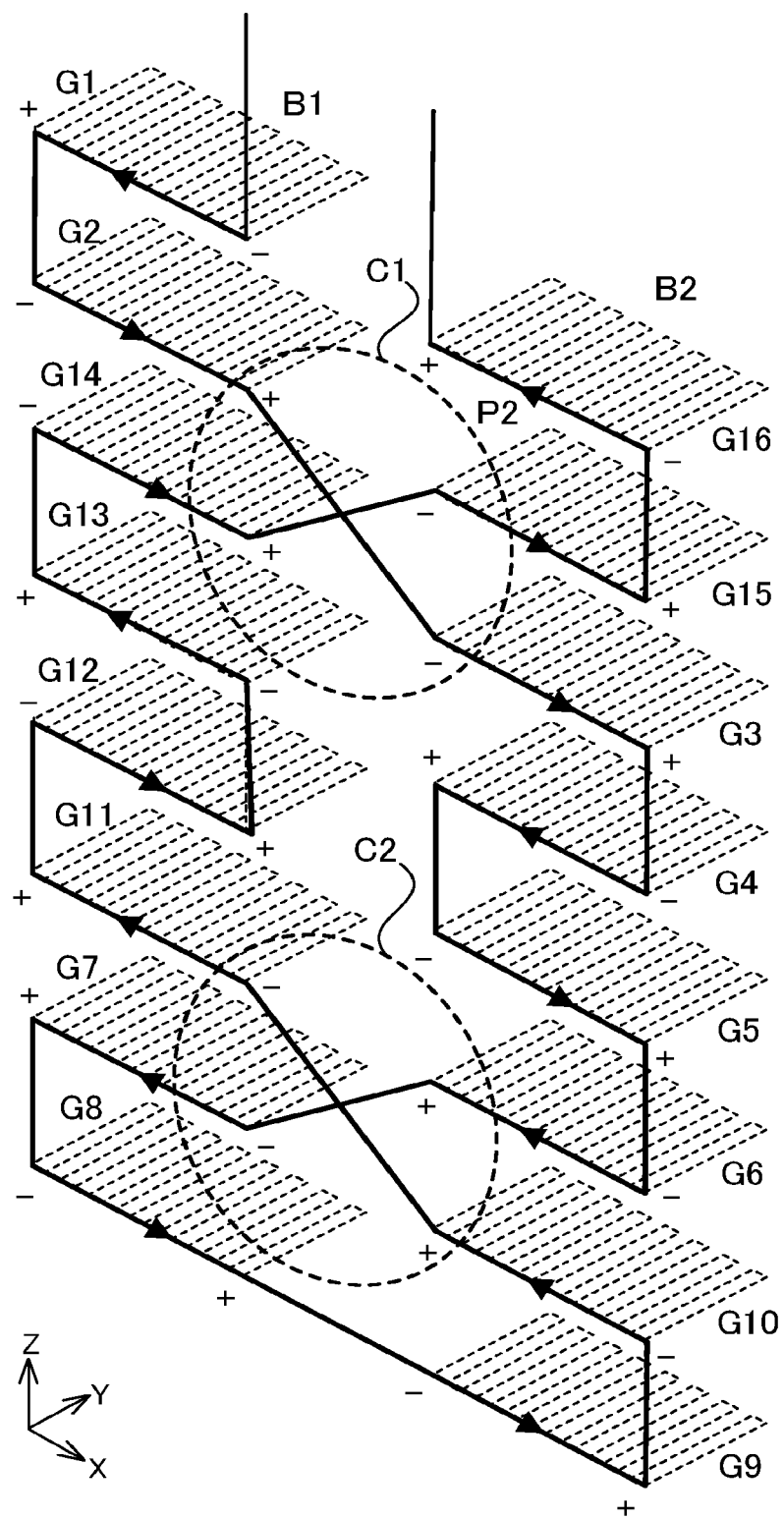
FIG. 13 is a diagram illustrating a current path formed by an intra-cell group current.

FIG. 13 illustrates a current path P2 formed by an intra-cell group current. Because an intra-cell group current direction is opposite to an intra-cell group current direction of at least one neighboring cell group in the column direction (Z-axis direction), directions of magnetic fields of the column direction generated by the intra-cell group current are alternately inverted and the magnetic fields are cancelled.

A plurality of cross connections are included in inter-column connection to connect the cell groups belonging to the cell group column B1 and the cell groups belonging to the cell group column B2. The cross connection means that four cell groups of two steps of the cell group columns of the two columns are connected to cross each other. More specifically, the cross connection means that a current output (plus pole) of a cell group of an N-th step of one cell group column and a current input (minus pole) of a cell group of an (N+1)-th step of the other cell group column are connected and a current input (plus pole) of a cell group of an (N+1)-th step of one cell group column and a current input (minus pole) of a cell group of an N-th step of the other cell group column are connected.

Figure 14:
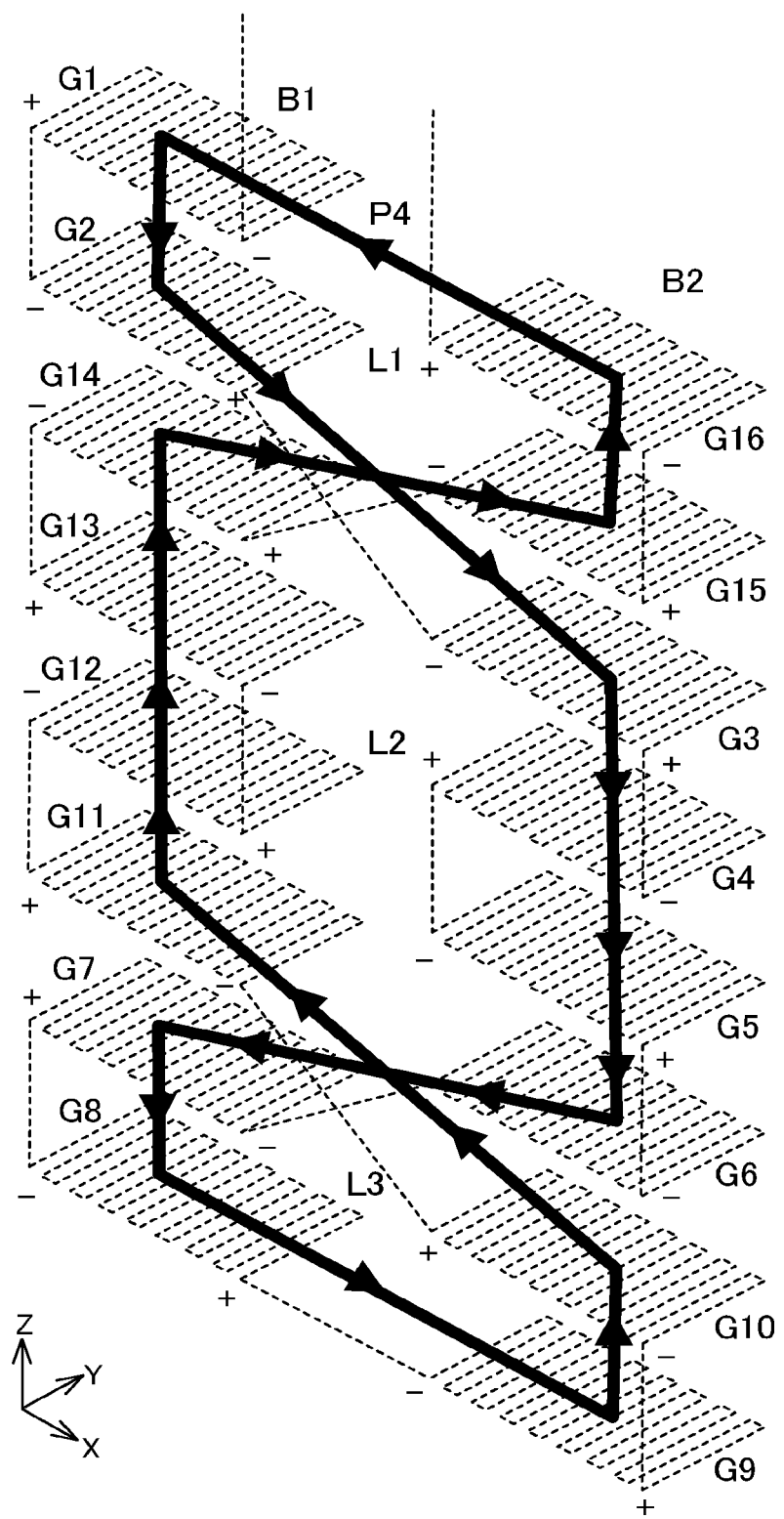
FIG. 14 is a diagram illustrating a current path formed by connecting cell groups along a flow of a current.

In the case of this embodiment, the four cell groups G2, G3, G14, and G15 of the second and third steps from the upper side form a cross connection C1 and the four cell groups G10, G11, G6, and G7 of the sixth and seventh steps from the upper side form a cross connection C2. FIG. 14 illustrates a current path P4 formed by connecting cell groups along a flow of a current. Because two cross connections are included in this matrix, three current loops L1 to L3 are formed in the battery according to this embodiment.

The number of cell groups belonging to the three current loops becomes a ratio of 1:2:1 sequentially in the column direction. In the case of this embodiment, the four cell groups G1, G2, G15, and G16 belong to the current loop L1.

In addition, the eight cell groups G3, G4, G5, G6, G11, G12, G13, and G14 belong to the current loop L2. In addition, the four cell groups G8, G7, G9, and G10 belong to the current loop L3. The current loop is a loop of a current functioning as a generation source of the magnetic field and a current path does not need to be closed in terms of an electric circuit.

Loop directions of the current loops adjacent to each other are opposite to each other. The loop directions of the current loops L1 and L3 become counterclockwise directions when viewed from a forward direction and the loop direction of the current loop L2 becomes a clockwise direction when viewed from the forward direction. Because the magnitude of the current loop L2 becomes the double of the magnitudes of the current loops L1 and L3, the magnetic fields generated by the current loops L1 to L3 are cancelled.

According to this embodiment, because the intra-cell current direction and the intra-cell group current direction are opposite to each other, the magnetic field generated externally by the battery 1 decreases. In addition, in the battery 1 according to the second embodiment, the cross connections are included such that the plurality of current loops are formed in the battery 1. In addition, the loop directions of the plurality of current loops are alternately inverted. Because the magnetic fields generated by the current loops are cancelled, the magnetic field generated externally by the battery 1 further decreases.

Third Embodiment

In the first and second embodiments, the two sub-modules 120L and 120R are connected to configure one battery module 100. However, the number of sub-modules in one battery module 100 is not limited to 2. Hereinafter, a battery 1 including a battery module 100 according to a third embodiment will be described.

Similar to the batteries 1 according to the first and second embodiments, the battery 1 is configured by laminating a plurality of battery modules 100. Because a configuration other than the battery module 100 is the same as the configurations of the batteries 1 according to the first and second embodiments, description thereof is omitted.

Figure 15:
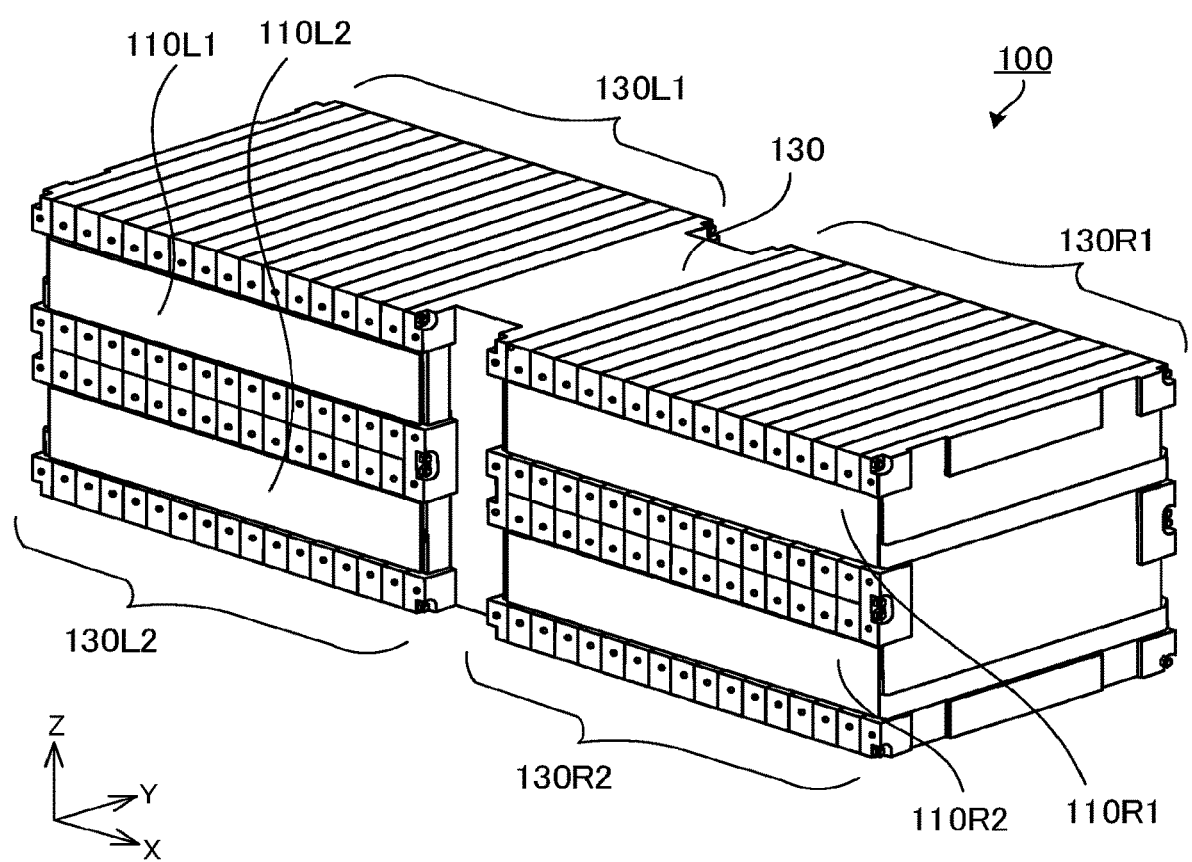
FIG. 15 is a perspective view of a battery module according to a third embodiment.

FIG. 15 is a perspective view of the battery module 100 according to the third embodiment. The battery module 100 according to the second embodiment is a battery module of 4 sub-modules including four sub-modules (130L1, 130L2, 130R1, and 130R2 illustrated in FIG. 15). In the third embodiment, the battery 1 is configured by laminating the battery modules 100 in four steps.

The four sub-modules 130L1, 130L2, 130R1, and 130R2 are arranged in a matrix. More specifically, the sub-module 130L1 and the sub-module 130R1 are arranged in a horizontal direction and the sub-module 130L2 and the sub-module 130R2 are arranged in a horizontal direction. In addition, the sub-module 130L1 and the sub-module 130L2 are arranged in a vertical direction and the sub-module 130R1 and the sub-module 130R2 are arranged in a vertical direction.

The battery module 100 includes four cell monitoring units 110L1, 110L2, 110R1, and 110R2 and a module body 130. The four sub-modules 130L1, 130L2, 130R1, and 130R2 are included in the module body 130.

The four cell monitoring units 110L1, 110L2, 110R1, and 110R2 are disposed in the four sub-modules 130L1, 130L2, 130R1, and 130R2, respectively. Configurations of the cell monitoring units 110L1 and 110L2 are the same as the configuration of the cell monitoring unit 110L according to the first embodiment and configurations of the cell monitoring units 110R1 and 110R2 are the same as the configuration of the cell monitoring unit 110R according to the first embodiment.

Figure 16A:
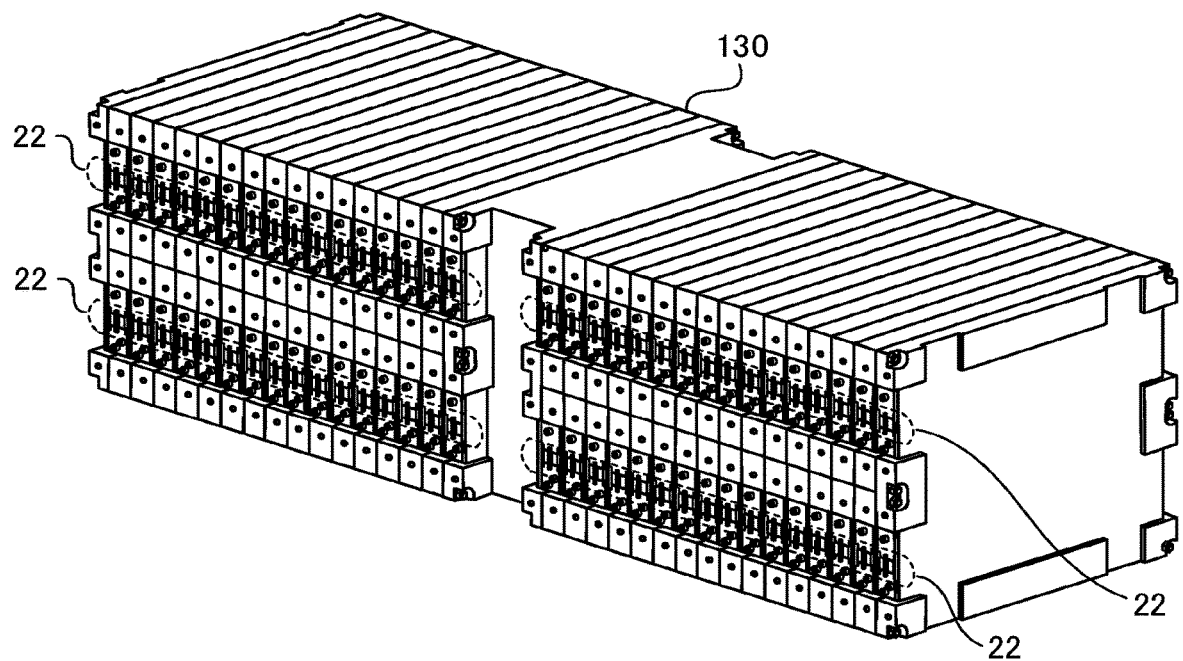
FIG. 16A is a diagram illustrating a module body of the battery module illustrated in FIG. 15.

FIG. 16A is a perspective view of the module body 130. The module body 130 is a storage unit that becomes a body of the battery module 100. The module body 130 is a portion remaining after the four cell monitoring units are extracted from the battery module 100 illustrated in FIG. 15. The four sub-modules 130L1, 130L2, 130R1, and 130R2 are included in the module body 130. In the third embodiment, one sub-module is configured by laminating 16 cells 20. However, the number of laminated cells 20 in one sub-module is not limited to 16. The number of laminated cells 20 may be larger than 16 and may be smaller than 16. When demagnetization is considered, the number of laminated cells 20 is preferably an even number.

Figure 16B:
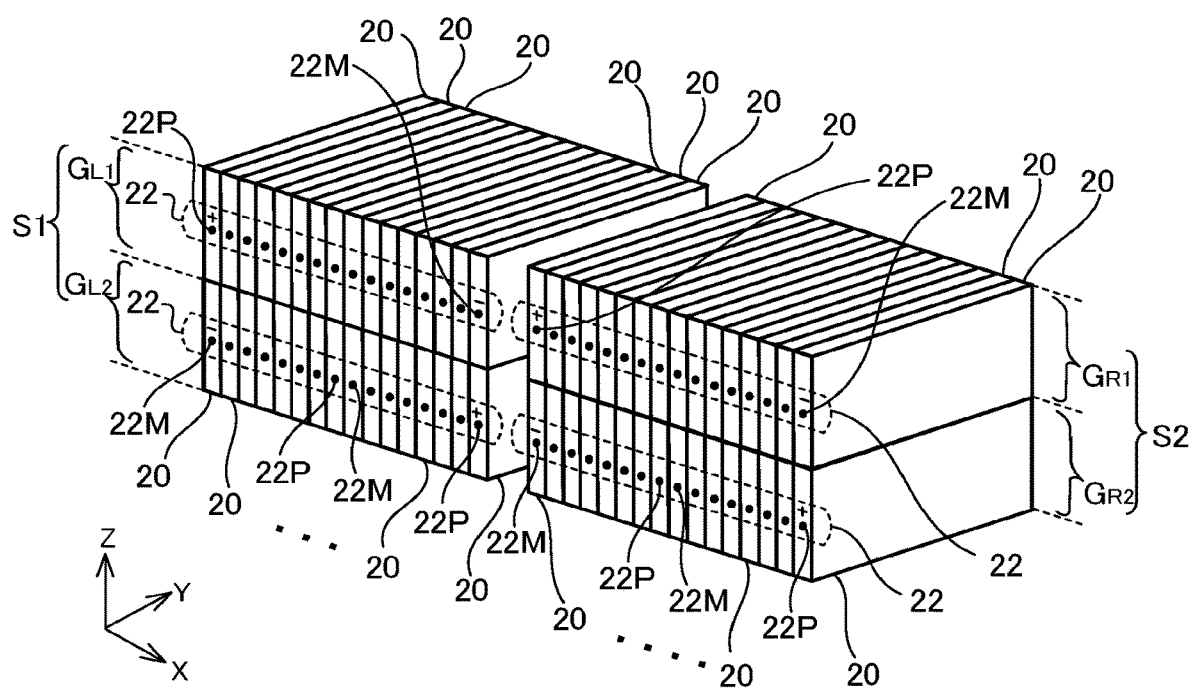
FIG. 16B is an extraction diagram of only cells from the module body.

FIG. 16B illustrates a state in which only the cells 20 are extracted from the battery module 100 to easily view an arrangement of the cells 20 in the battery module 100. The cells 20 are arranged such that intra-cell current directions are parallel. Polarities of the 16 cells 20 in each sub-module (each cell group) are alternately inverted. The 16 cells 20 in the cell group are connected in series to configure one sub-module.

Because the battery module 100 is formed using the four sub-modules, cell groups $G_{L1}$, $G_{L2}$, $G_{R1}$, and $G_{R2}$ are formed in the battery module 100. The cell group $G_{L1}$ corresponds to the sub-module 130L1, the cell group $G_{L2}$ corresponds to the sub-module 130L2, the cell group $G_{R1}$ corresponds to the sub-module 130R1, and the cell group $G_{R2}$ corresponds to the sub-module 130R2.

Terminals of the cells positioned at ends in the cell group become input and output terminals of a current of the sub-module. That is, a plus terminal 22P of the cell 20 of a left end (end of an X-axis minus direction) in the cell group $G_{L1}$ becomes an output terminal of the sub-module 130L1 and a minus terminal 22M of the cell 20 of a right end (end of an X-axis plus direction) in the cell group $G_{L1}$ becomes an input terminal of the sub-module 130L1. A minus terminal 22M of the cell 20 of a left end (end of the X-axis minus direction) in the cell group $G_{L2}$ becomes an input terminal of the sub-module 130L2 and a plus terminal 22P of the cell 20 of a right end (end of the X-axis plus direction) in the cell group $G_{L2}$ becomes an output terminal of the sub-module 130L2. In addition, a plus terminal 22P of the cell 20 of a left end (end of the X-axis minus direction) in the cell group $G_{R1}$ becomes an output terminal of the sub-module 130R1 and a minus terminal 22M of the cell 20 of a right end (end of the X-axis plus direction) in the cell group $G_{R1}$ becomes an input terminal of the sub-module 130R1. A minus terminal 22M of the cell 20 of a left end (end of the X-axis minus direction) in the cell group $G_{R2}$ becomes an input terminal of the sub-module 130R2 and a plus terminal 22P of the cell 20 of a right end (end of the X-axis plus direction) in the cell group $G_{R2}$ becomes an output terminal of the sub-module 130R1. The battery module 100 includes a total of eight input and output terminals including four input terminals and four output terminals.

A user constructs the matrix M1 illustrated in the first embodiment or the matrix M2 illustrated in the second embodiment by laminating the four battery modules 100.

According to this embodiment, because the battery module 100 is configured using the four sub-modules, the battery 1 is constructed more easily. As compared with the case in which the four battery modules are arranged simply, a capacity (volume) of the four sub-modules (that is, the battery module 100) in the battery decreases. Because the capacity of the battery module 100 configuring the battery 1 decreases, an energy density of the battery 1 can be improved.

Figure 17:
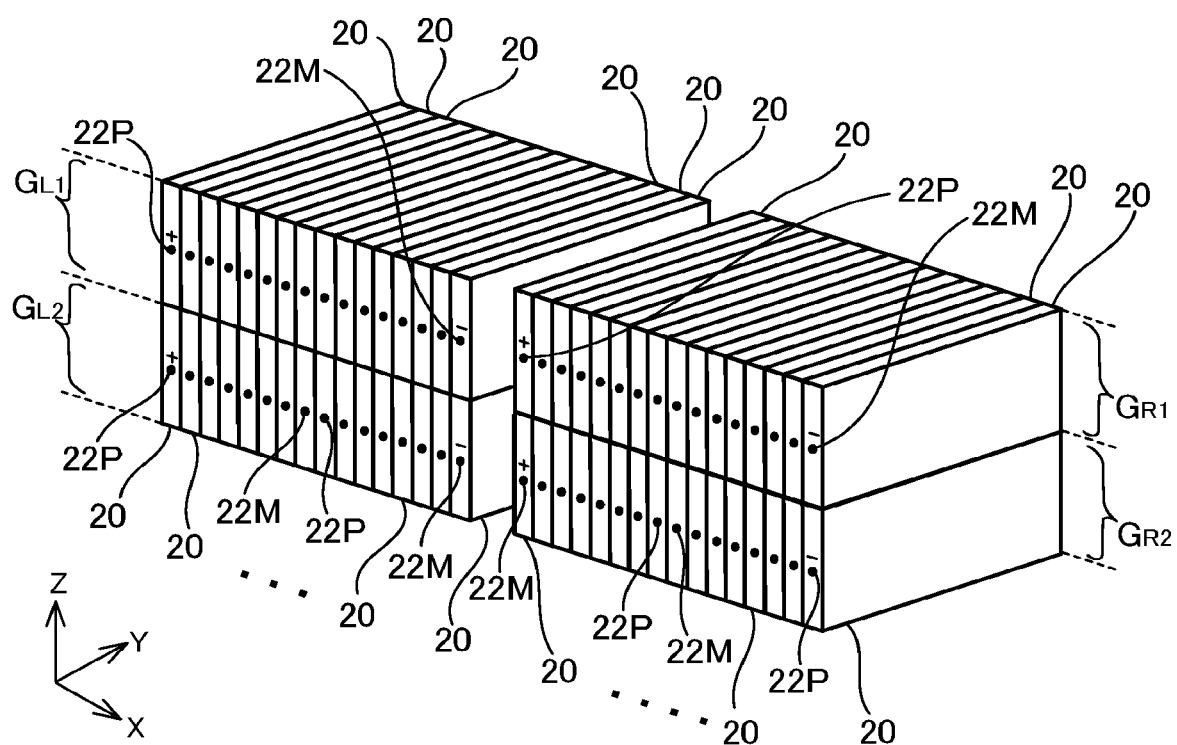
FIG. 17 is a diagram illustrating an aspect where sub-modules in a sub-module group have the same polarity.

The polarities of the four sub-modules may be different from the polarities in the case of FIG. 16B. For example, all of the polarities of the four sub-modules (four cell groups) may be opposite to the polarities in the case of FIG. 16B. In an example of FIG. 16B, the polarities of the sub-modules adjacent to each other in the column direction are opposite to each other. However, the polarities may be the same as illustrated in FIG. 17.

In addition, the four sub-modules may be connected in series two by two to facilitate the construction of the battery 1 more. For example, the sub-module 130L1 (cell group $G_{L1}$) and the sub-module 130L2 (cell group $G_{L2}$) may be connected in series to configure a first sub-module group S1 and the sub-module 130R1 (cell group $G_{R1}$) and the sub-module 130R2 (cell group $G_{R2}$) may be connected in series to configure a second sub-module group S2. In this case, the battery module 100 has two input and output terminals in one sub-module group and has a total of four input and output terminals.

The sub-modules that are connected in series are arbitrarily combined. For example, the sub-module 130L1 (cell group $G_{L1}$) and the sub-module 130R2 (cell group $G_{R2}$) may be connected in series to configure the first sub-module group S1 and the sub-module 130R1 (cell group $G_{R1}$) and the sub-module 130R2 (cell group $G_{R2}$) may be connected in series to configure the second sub-module group S2.

If the plus terminal and the minus terminal are connected, the terminals of the two sub-modules in the sub-module group may be arbitrarily connected. For example, in the example of FIG. 16B, the output terminal (plus terminal 22P at the left end) of the cell group $G_{L1}$ and the input terminal (minus terminal 22M at the left end) of the cell group $G_{L2}$ may be connected to configure the first sub-module group S1 and the input terminal (minus terminal 22M at the right end) of the cell group $G_{R1}$ and the output terminal (plus terminal 22P at the right end) of the cell group $G_{R2}$ may be connected to configure the second sub-module group S2. Or, the input terminal (minus terminal 22M at the right end) of the cell group $G_{L1}$ and the output terminal (plus terminal 22P at the right end) of the cell group $G_{L2}$ may be connected to configure the first sub-module group S1 and the output terminal (plus terminal 22P at the left end) of the cell group $G_{R1}$ and the input terminal (minus terminal 22M at the left end) of the cell group $G_{R2}$ may be connected to configure the second sub-module group S2.

Cross connection between columns may be included in serial connection. For example, in the case of an example of FIG. 17, the input terminal (minus terminal 22M at the right end) of the cell group $G_{L1}$ and the output terminal (plus terminal 22M at the left end) of the cell group $G_{R2}$ may be connected to configure the first sub-module group S1 and the output terminal (plus terminal 22P at the left end) of the cell group $G_{R1}$ and the input terminal (minus terminal 22M at the right end) of the cell group $G_{L2}$ may be connected to configure the second sub-module group S2.

The embodiments described above are exemplary and various changes and applications are enabled. For example, in the first embodiment, the number of cells 20 configuring the matrix M1 in the row direction is 16. However, the number of cells 20 in the row direction may be larger than 16 and may be smaller than 16. When the demagnetization is considered, the number of cells 20 in the row direction is preferably an even number and is more preferably a multiple of 4. In addition, in the first embodiment, the number of cells 20 configuring the matrix M1 in the column direction is 16. However, the number of cells 20 in the column direction may be larger than 16 and may be smaller than 16. When the demagnetization is considered, the number of cells 20 in the column direction is preferably an even number and is more preferably a multiple of 4. For the matrix M2 according to the second embodiment, the number of cells in the row direction and the column direction is preferably an even number or a multiple of 4.

In addition, in the first embodiment, the matrix M1 is configured using the cell group columns of the two columns. However, the number of cell group columns arranged in the row direction may be 2 or more. At this time, the number of cell group columns may be an even number or a multiple of 4. In addition, the battery 1 may be obtained by arranging the matrix M2 in the direction (Y-axis direction) vertical to the row direction and the column direction. In this case, the number of matrixes M2 may be an even number or a multiple of 4. In addition, in the first embodiment, the number of cell groups configuring one cell group column is 8. However, the number of cell groups may be larger than 8 and may be smaller than 8. When the demagnetization is considered, the number of cell groups is preferably an even number and is more preferably a multiple of 4. Also, the number of cells 20 configuring the cell group is preferably an even number or a multiple of 4.

In addition, in the second embodiment, the matrix M2 is configured using the cell group columns of the two columns. However, the number of cell group columns arranged in the row direction may be 2 or more. At this time, the number of cell group columns may be an even number or a multiple of 4. In addition, the battery 1 may be obtained by arranging the matrix M2 in the direction (Y-axis direction) vertical to the row direction and the column direction. In this case, the number of matrixes M2 may be an even number or a multiple of 4. In addition, in the second embodiment, the number of cell groups configuring one cell group column is 8. However, the number of cell groups may be larger than 8 and may be smaller than 8. When the demagnetization is considered, the number of cell groups is preferably an even number and is more preferably a multiple of 4. Also, the number of cells 20 configuring the cell group is preferably an even number or a multiple of 4.

In addition, in the second embodiment, the number of current loops included in the battery 1 is 3. However, the number of current loops formed in the battery 1 is not limited to 3. For example, one cross connection (for example, the four cell groups of the fourth and fifth steps) included in the matrix M2 may be formed and the two current loops may be formed in the battery 1. When the number of current loops is 2, the magnitudes (the number of cell groups belonging to the individual current loops) of the formed current loops may be the same. Of course, the number of current loops included in the battery 1 may be larger than 3. In addition, when the matrix M2 is arranged in the Y-axis direction, the current loops may be formed such that directions of the current loops adjacent to each other in an anterior-to-posterior direction become opposite to each other.

In addition, in the embodiments described above, the matrixes M1 and M2 of the cells 20 are formed by arranging the battery modules 100. However, the method of forming the matrixes is not limited thereto. The cells 20 may be arranged simply in a matrix with an insulating plate or a radiator plate therebetween.

In addition, in the embodiments described above, the cell 20 is the cell that can store power. However, the cell 20 may not store power. In the embodiments, the cell 20 is the lithium-ion-type cell. However, the cell 20 is not limited to the lithium ion type. For example, the cell 20 may be a nickel-cadmium-type battery, a nickel-hydrogen-type battery, and an alkaline-type battery.

In addition, in the embodiments described above, the cell 20 is the rectangular plate. The shape of the cell is not limited to the plate shape. For example, the shape of the cell 20 may be a cylindrical shape, a square shape, a button shape (coin shape), a laminate shape, and a pin shape.

In addition, in the embodiments described above, the battery 1 is the storage battery (secondary battery). However, the battery 1 may be a primary battery. In addition, the battery 1 may be a fuel battery. When the battery 1 is the fuel battery, the cells 20 configuring the battery 1 may be power generation cells.

In addition, the battery 1 according to the embodiments is disposed in the moving object. However, the battery 1 may be disposed in a building and may be used. The battery 1 may be disposed in an electric device and may be used. The electric device may be a power generation device or a transformation device and may be an electric apparatus such as a refrigerator. When the battery 1 is disposed, a moving object such as a vehicle, a railroad, a plane, and a ship can be regarded as the electric device.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms of modifications as would fall within the scope and spirit of the inventions.

What is claimed is:

1. A battery that includes a plurality of battery modules, wherein
    each of the battery modules includes a plurality of sub-modules arranged in a row direction of a matrix,
    each of the sub-modules includes a plurality of cell groups,
    each of the cell Groups includes a plurality of cells, an input terminal to input a current from the other cell group, and an output terminal to output the current to the other cell group,
    each of the cells includes a plus terminal and a minus terminal disposed on both ends of a longitudinal direction,
    the cells configuring each of the cell groups are connected in series, laminated in the row direction of the matrix, and integrally configured such that intra-cell currents through two of the cells adjacent to each other flow in parallel directions opposite to each other and perpendicular to the row direction and a column direction of the matrix,
    the battery modules are laminated in the column direction of the matrix, and
    the battery modules are connected in series directly by the input terminals and the output terminals of the cell groups, so that magnetic fields generated by currents flowing between the battery modules in the row direction and the column direction of the matrix are cancelled.

2. The battery module according to claim 1, wherein
    the battery module includes two sub-modules as the plurality of sub-modules,
    the two sub-modules are integrated and each of the two sub-modules includes the cell group configured using the plurality of cells connected in series, and
    each of the two sub-modules includes the input terminal to input a current to the cell group and the output terminal to output the current from the cell group.

3. The battery module according to claim 2, wherein
    the two sub-modules are arranged in a lamination direction of the cells.

4. A battery module according to claim 1, wherein
    the battery module includes four sub-modules as the plurality of sub-modules,
    the four sub-modules are integrated and each of the four sub-modules includes the cell group configured using the plurality of cells connected in series,
    the four sub-modules are connected in series two by two and configure two sub-module groups, and
    each of the two sub-module groups includes the input terminal to input a current to the cell group and the output terminal to output the current from the cell group.

5. The battery module according to claim 4, wherein
    the four sub-modules included in the two sub-module groups are arranged in a matrix.

6. A battery comprising:
    a plurality of battery modules according to claim 1.

7. The battery according to claim 6, wherein
    the matrix includes a plurality of cell group columns obtained by laminating cells groups obtained by arranging the cells in the row direction in the column direction,
    the cell group columns are configured to be arranged in the row direction, and
    an intra-cell group current direction of each of the cell groups is opposite to the intra-cell group current direction of the cell group adjacent to each cell group in the column direction.

8. The battery according to claim 6, wherein
    the matrix includes a first cell group column obtained by laminating cells groups obtained by arranging the cells in the row direction in the column direction and a second cell group column configured using the plurality of cell groups laminated in the column direction and arranged to be adjacent to the first cell group column in the row direction,
    inter-column connection to connect the cell groups belonging to the first cell group column and the cell groups belonging to the second cell group column includes at least one cross connection, such that at least two current loops formed by connecting the cell groups along a flow of a current are formed in the battery, and
    loop directions of the current loops adjacent to each other in the column direction are opposite to each other.

9. The battery according to claim 8, wherein
    the cell groups are laminated in the column direction by a multiple of 4,
    two cross connections are included in the battery, such that three current loops are formed along the column direction,
    the loop directions of the current loops adjacent to each other in the three current loops are opposite to each other, and
    the number of cell groups belonging to the three current loops becomes a ratio of 1:2:1 sequentially in the column direction.

10. The battery according to claim 6, wherein the cells configuring the plurality of battery modules store power.

11. An electric device comprising the battery according to claim 6.

12. The battery according to claim 1, wherein the cell groups included in the battery modules laminated in the adjacent rows of the matrix are connected by the input terminal and the output terminal through a plurality of inter-row connections, such that at least two current loops are formed in order in the column direction, the currents through two of the current loops adjacent to each other flow in directions opposite to each other.

13. The battery according to claim 12, wherein two of the inter-row connections are included in the battery, such that three of the current loops are formed in order in the column direction, and the number of the cell groups belonging to the three current loops is a ratio of 1:2:1 in order in the column direction.

14. A rechargeable battery comprising:

a battery to claim 1, wherein the cells configuring the cell groups are rechargeable.

* * * * *